United States Patent [19]
Albrecht et al.

[11] Patent Number: 4,910,625
[45] Date of Patent: Mar. 20, 1990

[54] ARTICLE SURVEILLANCE APPARATUS AND SYSTEMS FOR COMPUTER DATA DISKS

[75] Inventors: Frederick X. Albrecht; Matthias H. Regelsberger, both of Rochester; Michael J. Yurgosky, Pittsford, all of N.Y.

[73] Assignee: Eastman Kodak Company, Rochester, N.Y.

[21] Appl. No.: 255,882

[22] Filed: Oct. 11, 1988

[51] Int. Cl.$^4$ ............................ G11B 5/82; G11B 15/04
[52] U.S. Cl. ........................................ 360/135; 360/60; 360/133
[58] Field of Search ............................ 360/133, 135, 60

[56] References Cited
U.S. PATENT DOCUMENTS

| | | | |
|---|---|---|---|
| 3,665,449 | 5/1972 | Elder et al. | 340/280 |
| 3,747,086 | 7/1973 | Peterson | 340/280 |
| 3,820,104 | 6/1974 | Fearon | 340/258 |
| 3,947,661 | 3/1976 | Silverman et al. | 360/60 |
| 4,074,249 | 2/1978 | Minsy | 340/28 |
| 4,499,444 | 2/1985 | Heltemes et al. | 335/284 |
| 4,553,136 | 11/1985 | Anderson, III et al. | 340/572 |
| 4,660,025 | 4/1987 | Humphrey | 340/572 |
| 4,665,387 | 5/1987 | Cooper et al. | 340/572 |
| 4,710,752 | 12/1987 | Cordery | 340/551 |
| 4,785,361 | 11/1988 | Brotby | 360/60 |
| 4,794,470 | 12/1988 | Lauffenburger et al. | 360/60 |

FOREIGN PATENT DOCUMENTS

| | | | |
|---|---|---|---|
| 52-22781 | 9/1978 | Japan . | |
| 53-108412 | 9/1978 | Japan | 360/60 |
| 54-111321 | 8/1979 | Japan | 360/60 |
| 2154350 | 9/1985 | United Kingdom . | |

Primary Examiner—Vincent P. Canney
Attorney, Agent, or Firm—Francis H. Boos, Jr.

[57] ABSTRACT

An article surveillance marker suitable for use on computer magnetic data disks is disclosed in which the marker, a length of low coercivity, high magnetic permeability ferromagnetic material is integrally formed onto the data disk preferably so as to serve as the concentricity determining factor of the disk, whereby attempted removal or override of the marker renders the disk from unauthorized reproduction. A disk drive sytem is also disclosed with a built-in interrogation zone and write inhibit circuit that insures data originating from the host computer or copied from another marker-protected disk can only be written onto a disk having a marker-protected disk.

16 Claims, 2 Drawing Sheets

ARTICLE SURVEILLANCE APPARATUS AND SYSTEMS FOR COMPUTER DATA DISKS

FIELD OF THE INVENTION

This invention relates to article surveillance systems and apparatus for protecting the security of data that is recorded or is to be recorded on magnetic media, particularly on computer magnetic disks or magneto-optical disks which are removable from the computer by the computer user.

BACKGROUND OF THE INVENTION

Article surveillance systems that work on the principle of detecting the presence of a particular form of ferromagnetic material in a periodically changing low level magnetic field are well known. U.S. Pat. No. 4,553,136 illustrates a representative system of this type in which an article to be protected against unauthorized removal from a defined area, such as a store or library, has a marker attached to it that has in it a strip of low coercivity ferromagnetic material of high permeability. When the article, with the marker attached, is brought into an interrogation zone in which the low level periodically changing magnetic field is applied via a radiating antenna located at the edge of the zone, the presence of the strip modifies the pattern of the applied field, generating magnetic sub-fields at harmonics of the fundamental frequency of the applied field. These harmonic fields are picked up by a receiving antenna also located at the edge of the interrogation zone and fed to a receiver where they are detected and used to trigger an alarm to signal the unauthorized removal of the article. Other representative examples of ferromagnetic marker systems of this general type are found in U.S. Pat. Nos. 3,665,449; 3,747,086; 3,820,104 and 4,710,752.

To allow the article to be removed from the area without triggering an alarm, the marker may be physically removed from the article by an authorized person using a special tool. Alternatively, as disclosed in U.S. Pat. Nos. 3,665,449 and 3,820,104, for example, a high coercivity ferromagnetic strip placed adjacent the low coercivity strip in the marker may be changed from an unmagnetized to a magnetized state at the time of sale or checkout to render the marker ineffective in the low level field of the interrogation zone.

When magnetic markers are employed with magnetic media, such as cartridges containing audio or video tapes, care must be taken to make certain that the surveillance system does not compromise the information recorded on the magnetic media. U.S. Pat. Nos. 4,499,444 and 4,665,387, for example, show surveillance systems for magnetic tape products using a magnetic marker placed in the cartridge but physically separate from the magnetic tape media. Carefully designed apparatus disclosed in each of the patents is employed to deactivate the marker without compromising the recorded information. This is done by magnetizing an adjacent high coercivity strip in the marker using a highly concentrated (localized) magnetic field that does not extend to any harmful degree to the magnetic tapes and thus does not deleteriously affect the magnetic tape media itself.

There is a need for surveillance systems to provide security protection for computer disk magnetic media. With the proliferation in business and government of personal computers and the ready portability and easy concealibility of the miniature data disks used by these computers it is important to provide systems comparable to the above described types that ensure that sensitive data is not lost or compromised intentionally or unintentionally by unauthorized removal from secure areas in which the data is normally used. While nonmagnetic marker systems are available for surveillance purposes and would have the advantage of not interfering with the magnetic media of data disks, they are generally not physically suited to the miniature size and slim geometries of conventional magnetic, optical and magneto-optical data disks employed with personal computers. Use of the ultra thin magnetic strips are highly desirable for this purpose.

One proposal for a surveillance system for magnetic data disks involves the attachment of a low coercivity, high magnetic permeability ferromagnetic marker strip to an inside surface of the jacket in which the disk is housed. This, however, would allow the system to be easily defeated by removing the disk from the jacket and reinserting it into another, non-protected jacket with the data on the disk still intact. Moreover, data on a protected disk cartridge could be transferred by a simple computer copy process onto an unprotected disk cartridge and safely removed from the area.

Unlike the case of clothing and books in which the surveillance system protects the physical article, computer data disks present the more intricate problem of the need to protect the data recorded on the disk from unauthorized removal even when the article itself, i.e. the disk, is not removed.

It is therefore an object of the present invention to provide article surveillance apparatus and system especially adapted for use in computer data disk, particularly of the mini and micro disk size.

It is a further object of the present invention to provide article surveillance apparatus and system that protects the security of the recorded data irrespective of concern for the physical condition of the article on which the data is recorded.

It is a still further object of the invention to provide a system for ensuring that data to be protected is not compromised by copying onto unprotected media.

SUMMARY OF THE INVENTION

Unlike systems of the above-described type that are typically used in stores and libraries, an important aspect of the present invention is the realization that it is the data which is recorded on computer disks that must be protected from unauthorized removal from secure areas and that what happens to the physical article on which the data is recorded is of secondary concern. To this end, in accordance with the invention, there is provided article surveillance apparatus for computer data disks comprising a magnetic marker integrally formed on the data disk such that attempted removal of the marker would render the disk inoperable and attempted override of the marker with permanent magnet means would eradicate some or all of the data on the disk. Such a marker may take the form of a hub ring stamped out of low coercivity, high permeability amorphous ferromagnetic material and adhered by suitable adhesive means to the center hole of the disk so as to form the mechanism by which concentricity of the disk is established. Attempted removal of the hub ring would destroy the concentricity of the disk vis-a-vis the data tracks and make the disk unreadable. Alternatively, the ferromagnetic strip may form the basis of an adhesive ring used to adhere the central drive hub onto a 3.5" data disk, whereby attempted removal of the strip would also destroy the concentricity of the disk. Although enhanced security of the recorded data is an important feature of this invention, the integral nature of the marker also enhances the ability to provide an "audit trail" for the disk, i.e. keeping a record of who has the disk outside a secure area (such as an office with interrogation zones at all entrances).

To further protect sensitive data, a system according to the invention is provided in which a low level magnetic field generator and sensor arrangement is incorporated in the disk drive system of the computer with the output of the sensor fed to a write control circuit. When a disk bearing the appropriate marker is inserted into the disk drive, the sensor detects the presence of the marker and sends a write enable signal to the control circuit thus allowing the data to be written onto the disk. Absence of the marker would inhibit writing of data onto an unprotected disk. Thus, a system is provided that prevents unauthorized copying of sensitive data from a protected disk onto an unprotected disk. Additionally, it guards against the possibility that sensitive data would be "saved", i.e. recorded, inadvertently onto an unprotected disk directly from the computer memory. With this system, data of an entire secure area can be protected by installing or retrofitting all computers in this area with such modified disk drives. In this way, data to be protected is, therefore, only available on "secure", i.e. marker protected, disks which cannot be removed from the area under control without being detected. With a system of this type the disk drive mechanism, i.e. drive spindle, disk clamp, etc., would typically be comprised of non-ferromagnetic material, such as plastic, that would not interfere with the detection of the marker in the presence of the low level magnetic field.

DETAILED DESCRIPTION OF THE PREFERRED EMBODIMENT

Figure 1:
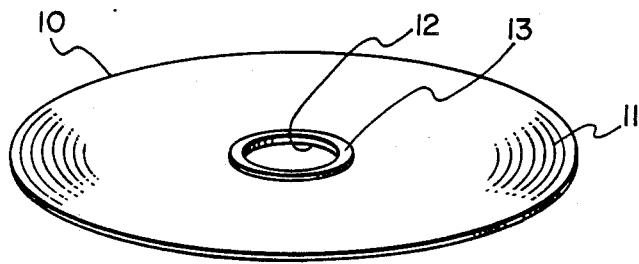
FIG. 1 is a perspective view of a 5.25" magnetic data disk embodying one form of the invention.
Figure 2:
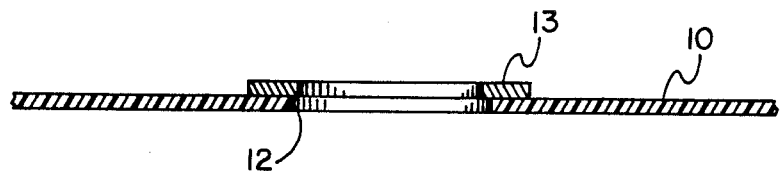
FIG. 2 is a sectional view of the data disk of FIG. 1 showing the invention in greater detail.

Referring jointly to FIGS. 1 and 2, there is shown a 5.25" magnetic data disk 10 which comprises a circular disk of thin high polymer material on which a coating of magnetic recording material is formed on both surfaces to which a recording/reproducing magnetic head (not shown) is to be brought in close proximity for write-/read of data recorded in the media on concentric tracks 11. A circular aperture or hub 12 formed in the center of the disk is adapted for reception of the drive spindle (not shown) of a disk drive system. In a conventional disk of this type, a circular reinforcing ring 13 is conventionally secured to the central hub 12 of disk 10 by suitable adhesive means to lengthen the reusable life of the disk by protecting the hub from prematurely wearing out in normal use. In accordance with a feature of the invention, hub ring 13 comprises the magnetic marker for surveillance control and for this purpose is preferably formed of an amorphous ferromagnetic material having a relatively low coercivity and a high magnetic permeability. In a preferred form of the invention, the coercivity, as measured in an external magnetic field changing its field strength and direction periodically with a frequency of 60 Hz, should not exceed about 5 oersteds and most preferably should be less than 0.5 oersteds. Correspondingly, the material should have relatively high magnetic permeability with a value preferably not lower than 20,000 and, most preferably, greater than 100,000. Suitable material for use as the hub ring marker 13 would be an amorphous ferromagnetic material such as is described in U.S. Pat. No. 4,553,136. A material of this type is sold under trademark "Metglas" by Allied Corporation of Morristown, N.J.. Alternatively, a ferromagnetic material having a high Barkhausen effect, such as described in U.S. Pat. No. 4,660,025, may also be used. Hub ring marker 13 as shown in FIG. 1, is an unbroken ring extending continuously about the aperture 12 of disk 10. In order to enhance the field modifying effect of the ring, it may be desirable to provide one or more radially extending gaps in ring 13 such that ring 13 extends discontinuously about central aperture 12. Additionally, there is normally a significant band of unrecorded surface area on disk 10 extending radially outward from aperture 12. This allows a degree of latitude in determining the radial dimension of hub ring marker 13 for a desired field modifying effect within the overall dimensional constraints of the disk format.

Further in accordance with an important aspect of the invention, hub ring marker 13 is formed integrally onto the polymer material of the disk by means of suitable adhesive material, preferably a high strength pressure sensitive adhesive, or by means of an ultrasonic bonding process, such that any attempt to remove the hub ring marker 13 would physically damage the disk by removing the means by which concentricity of the disk is determined thus making it virtually impossible to read the data on the disk in a disk drive. As a consequence, an attempt to remove the hub ring marker 13 to enable surreptitious removal of the disk from a secure area would result in protection of the data on the disk by making it no longer accessible even though the physical article itself, namely the disk, would be destroyed for all practical purposes. To enhance the concentricity determining aspect of the hub ring marker 13, aperture 12 can be made slightly larger in diameter than the drive spindle of the disk drive and ring 13 made the correct diameter, as shown in FIG. 2. Additionally, the centers of aperture 12 and ring 13 can be slightly offset so that even extremely careful removal of ring 13 would still eliminate the concentricity of the disk 10 vis-a-vis recorded tracks 11.

Figure 3:
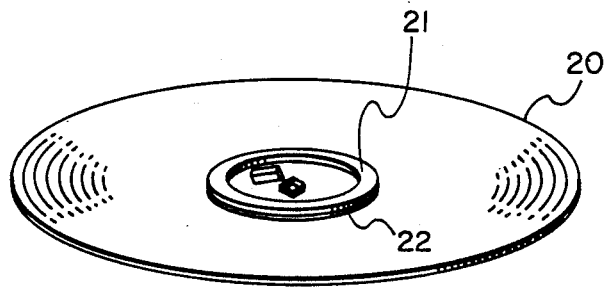
FIG. 3 is a perspective view of a 3.5" magnetic data disk embodying another form of the invention.
Figure 4:
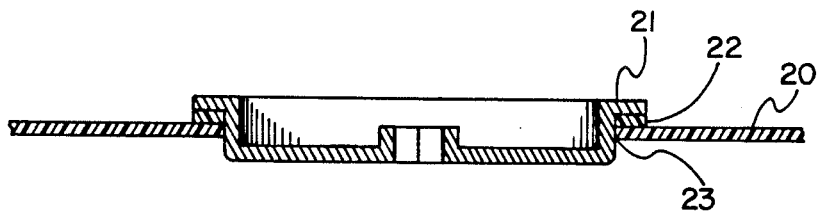
FIG. 4 is a sectional view of the data disk of FIG. 3 showing the invention embodied therein in greater detail.

Referring to FIGS. 3 and 4, there is shown a standard 3.5" format microfloppy disk 20 having a central drive hub 21 secured in conventional manner by an adhesive ring 22 to the center aperture 23 of the disk 20. In accordance with the invention, adhesive ring 22 comprises the marker for disk 20 and, to this end, is formed of the amorphous ferromagnetic material described above in connection with FIGS. 1 and 2. In a conventional 3.5" microfloppy disk, central drive hub 21 is typically made from a ferromagnetic material, such as iron, to cooperate with a magnetic clamping arrangement on the drive spindle of the disk drive system. In order that the hub ring marker 22 of disk 20 be fully effective to modify the field pattern of an interrogation zone as described above or to insure that the field modifying effect of ring marker 22 is not easily overridden by magnetizing central drive hub 21, it may be preferable that central drive hub 21 be formed of a non-ferromagnetic material, such as plastic. In this event, a modified form of disk drive apparatus may be required to maintain the disk on the drive spindle, for example by employing a compression spring clamping arrangement of suitable design.

Figure 5:
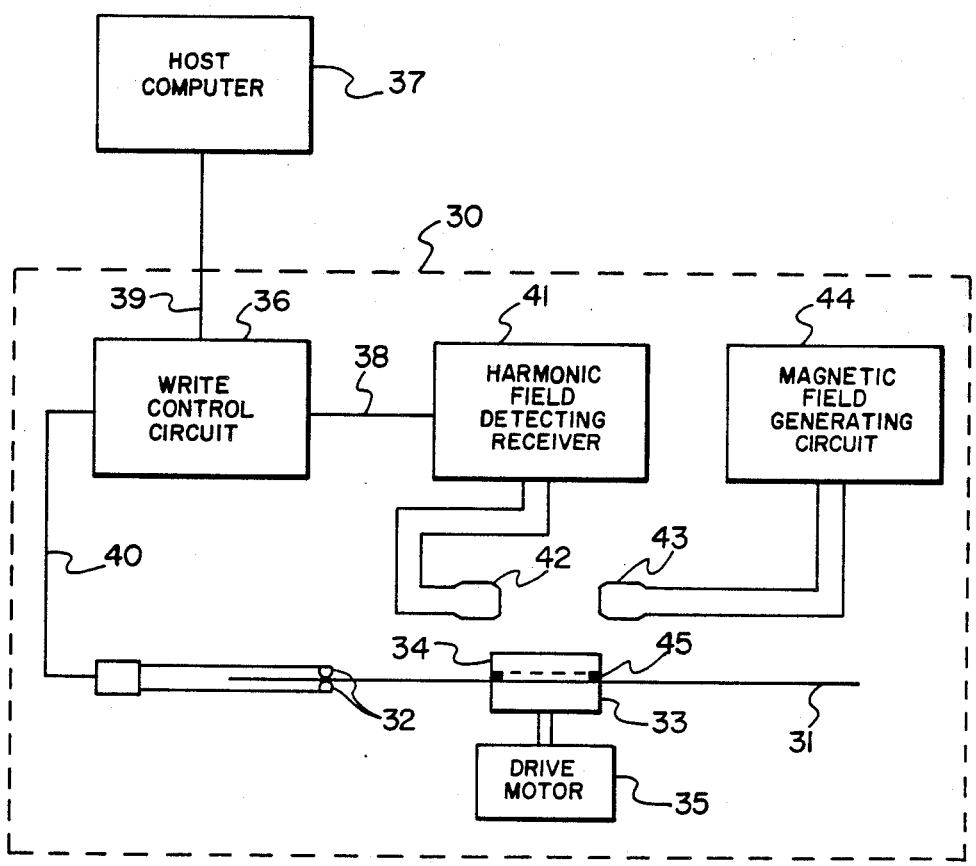
FIG. 5 is simplified schematic showing of a disk drive system embodying a form of the invention useful in the recording of sensitive data on the disks of FIGS. 1 and 3.

Referring now to FIG. 5, there is shown an article surveillance control system according to the invention which comprises a disk drive and write control means effective to ensure that sensitive data is written only onto protected disks of the type described in connection with FIGS. 1–4. To this end, the system of FIG. 5 includes a disk drive 30 adapted to receive and rotationally drive a 5.25" or 3.5" disk 31 while data is written onto or read from disk 31 by means of magnetic heads 32 in conventional manner. In all respects, the rotating drive mechanism of disk drive 30, including drive motor 35, drive spindle 33 and disk clamp 34 is of conventional construction except that drive spindle 33 and hub clamp 34 are preferably comprised of a non-ferromagnetic material, such as a suitable plastic. Magnetic write/read heads 32 are coupled through a write control circuit 36 to a host computer 37. Write control circuit 36 comprises a gating circuit operative in response to a signal level on input line 38 to enable or inhibit the passage of data signals on line 39 from computer 37 through to output line 40 for application to write/read heads 32. A magnetic field generating circuit 44 is included in the disk drive system of the invention to generate a low level periodically changing magnetic field via radiating antenna 43 positioned adjacent the spindle drive 33 and disk clamp 34. An antenna 42, similarly mounted adjacent the drive components 33,34, is coupled to harmonic field detecting receiver circuit 41 to sense the presence of field patterns occurring at harmonics of the magnetic field applied by generating circuit 44 via radiating antenna 43. The output of receiver circuit 41 is coupled by line 38 to write control circuit 36 to serve as the control signal which causes control circuit 36 to inhibit or enable the writing of data onto a disk inserted in the drive.

In operation, with the computer in the "on" condition, a low level periodically changing magnetic field is generated by circuit 44 and radiating antenna 43 in the vicinity of the drive spindle of the disk drive system 30. If a protected disk 31 of the type described above in relation to FIGS. 1–4 having a desired ferromagnetic marker 45 integrally formed about the hub of the disk 31 is in place in the drive, the applied magnetic field is disturbed by the marker and harmonic fields are generated. These harmonic fields are picked up by sensor antenna 42 and detected in receiver circuit 41 wherein an appropriate "enable" control signal level is produced and applied via line 38 to control circuit 36 to enable the writing of data onto disk 31. If an unprotected disk is placed in the drive, the absence of a marker 45 results in no harmonic fields being generated. This, in turn, causes receiver circuit 41 to send an "inhibit" control signal level to control circuit 36 to inhibit the writing of data onto the unprotected disk. In this way, sensitive data created on the computer is assured of being "saved" or recorded only onto protected disks, the unauthorized removal of which from the secure area can be detected by conventional interrogation zone systems. Moreover, data on a protected disk is prevented from being copied onto an unprotected disk by this system, since all such data must be enabled through the write control circuit 36 in order to be recorded on a disk. Since all components of this surveillance control system are incorporated in the disk drive housing, conventional computers can be easily retrofitted to include this data protection capability thus avoiding the need to replace or retrofit entire computer systems.

While the invention has been described in connection with use on recording disks in which write/read of data is performed entirely by magnetic means, it will be appreciated that a marker of the type described can also be integrally formed onto optical and thermo-magneto-optical disks in which an optical beam is employed in the write/read process. Additionally, the effect of the marker on generating harmonic magnetic fields in the sensing zone can be enhanced by using an adhesive in which amorphous ferromagnetic powders have been dispersed during the formulation thereof. Moreover, an adhesive formulated in this manner makes it possible to employ printing techniques to form the marker on the data disks, either in conjunction with use of the amorphous ferromagnetic ring or when used alone as a marker surface on the face of the disk.

The invention has been described in detail with particular reference to a presently preferred embodiment, but it will be understood that variations and modifications can be effected within the spirit and scope of the invention.

What is claimed is:

1. Article surveillance apparatus for a computer data disk having a recording surface of magnetic material with a predetermined coercivity, the apparatus comprising a ferromagnetic marker material having a coercivity substantially lower than that of the magnetic recording surface, the marker being formed integrally on the disk and so positioned thereon that removal of the marker would render the disk unusable for reproduction of data from the disk.

2. Article surveillance apparatus according to claim 1 in which the marker is formed circumferentially about a central drive aperture in the disk.

3. Article surveillance apparatus according to claim 2 in which the marker comprises the concentricity determining structure of the disk.

4. Article surveillance apparatus according to claim 2 in which the marker extends continuously about the central aperture of the disk.

5. Article surveillance apparatus according to claim 2 in which the marker extends discontinuously about the central aperture of the disk.

6. Article surveillance apparatus according to claim 1 in which marker comprises a preformed length of amorphous ferromagnetic material having a coercivity less than about 5 oersted and a magnetic permeability greater than about 20,000.

7. Article surveillance apparatus according to claim 6 in which the marker coercivity is less than about 0.5 oersted and the magnetic permeability is greater than about 100,000.

8. Article surveillance apparatus according to claim 1 in which the marker comprises a length of ferromagnetic material integrally bonded to the disk.

9. Article surveillance apparatus according to claim 8 in which the marker is adhesively bonded to the disk.

10. Article surveillance apparatus according to claim 8 in which the marker includes an adhesive material having dispersed amorphous ferromagnetic particles therein.

11. Article surveillance apparatus according to claim 10 in which the marker consists of an adhesive material bonded to the disk, the adhesive material having dispersed amorphous ferromagnetic particles therein.

12. A computer data disk having article surveillance protection comprising:
a disk substrate having a central aperture;
a magnetic recording material formed on the surface of the disk for use in magnetically recording data in a series of tracks concentric with said central aperture, said magnetic recording material having a predetermined coercivity;
and a surveillance marker comprised of ferromagnetic material integrally bonded to said disk substrate about the central aperture thereof such that attempted removal of the marker would render the disk unusable for reproduction of data from the disk, said ferromagnetic marker material having a coercivity substantially lower than the coercivity of the magnetic recording material.

13. A computer data disk according to claim 12 further including a central drive hub adapted to engage the drive spindle of a disk drive, said drive hub consisting of a non-magnetic material, and in which said marker comprises a ring-shaped length of adhesively coated low coercivity ferromagnetic material and serves to adhesively bond said central drive hub to said disk substrate.

14. A computer data disk according to claim 12 in which said marker consists of adhesive material bonded to the disk with amorphous ferromagnetic particles dispersed in the adhesive material.

15. A computer data disk according to claim 12 in which the ferromagnetic marker material encircles the central aperture of the disk and has a central aperture slightly smaller than the disk central aperture so as to serve as the concentricity determining structure of the disk.

16. A computer data disk according to claim 15 in which the centers of the central apertures of the disk and the marker are slightly offset from each other.

* * * * *

UNITED STATES PATENT AND TRADEMARK OFFICE
CERTIFICATE OF CORRECTION

PATENT NO. : 4,910,625
DATED : March 20, 1990
INVENTOR(S) : Frederick X. Albrecht et al.

It is certified that error appears in the above-identified patent and that said Letters Patent are hereby corrected as shown below:

Right Column, Cover, Abstract, Line 8     after first occurrence of "disk" insert --unusable thus protecting the data recorded on the disk--

Signed and Sealed this

Twenty-sixth Day of November, 1991

Attest:

HARRY F. MANBECK, JR.

*Attesting Officer*     *Commissioner of Patents and Trademarks*